United States Patent
Ohkita

(10) Patent No.: US 8,032,911 B2
(45) Date of Patent: Oct. 4, 2011

(54) RELAY DEVICE AND RELAY METHOD

(75) Inventor: Hideki Ohkita, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 12/463,928

(22) Filed: May 11, 2009

(65) Prior Publication Data

US 2009/0288130 A1    Nov. 19, 2009

(30) Foreign Application Priority Data

May 13, 2008  (JP) ................................. 2008-126081

(51) Int. Cl.
*H74N 7/18*    (2006.01)
*G06F 15/16*   (2006.01)
*H04L 12/28*   (2006.01)
*H04L 12/56*   (2006.01)

(52) U.S. Cl. .............. 725/74; 725/78; 725/80; 709/245; 370/402

(58) Field of Classification Search .................. 370/402; 709/245; 725/74, 78, 80–82, 85
See application file for complete search history.

(56) References Cited

U.S. PATENT DOCUMENTS

| | | | | |
|---|---|---|---|---|
| 5,754,548 | A * | 5/1998 | Hoekstra et al. ............. | 370/402 |
| 7,849,218 | B2 * | 12/2010 | Funabiki et al. ............. | 709/245 |
| 2003/0161332 | A1 * | 8/2003 | Ohno et al. .................... | 370/401 |
| 2006/0117367 | A1 * | 6/2006 | Lyle ............................... | 725/114 |
| 2007/0230909 | A1 | 10/2007 | Mukaide et al. | |
| 2009/0089842 | A1 * | 4/2009 | Perry et al. ...................... | 725/78 |

FOREIGN PATENT DOCUMENTS

| | | |
|---|---|---|
| JP | H10-200583 A | 7/1998 |
| JP | 2004-274608 A | 9/2004 |
| JP | 2008-034976 | 2/2008 |
| JP | 2008-035190 | 2/2008 |
| JP | 2008-153826 A | 7/2008 |
| JP | 2008-153974 A | 7/2008 |
| JP | 2008153974 A * | 7/2008 |
| WO | WO 2005/006740 A1 | 1/2005 |
| WO | WO 2007/136038 A1 | 11/2007 |

OTHER PUBLICATIONS

'High-Definition Multimedia Interface Specification', Jun. 22, 2006, Version 1.3, pp. 123-125.*
Explanation of Non-English Language Reference(s).

* cited by examiner

*Primary Examiner* — William Trost, IV
*Assistant Examiner* — Omar S Parra
(74) *Attorney, Agent, or Firm* — Knobbe, Martens, Olson & Bear LLP

(57) ABSTRACT

According to one embodiment, a relay device includes an address management module which executes processing of acquiring a first physical address assigned to the relay device based on a sink device, processing of acquiring a second physical address assigned to the relay device based on another sink device, determination processing of determining, in the case where it is determined that the command needs to be transmitted to the other sink device, whether to perform conversion of the physical address included in a parameter in the other sink device, and conversion processing of converting, in the case where it is determined that the conversion of the physical address is not performed in the other sink device, the physical address included in the parameter into a physical address based on the other sink device using the first and second physical addresses.

14 Claims, 14 Drawing Sheets

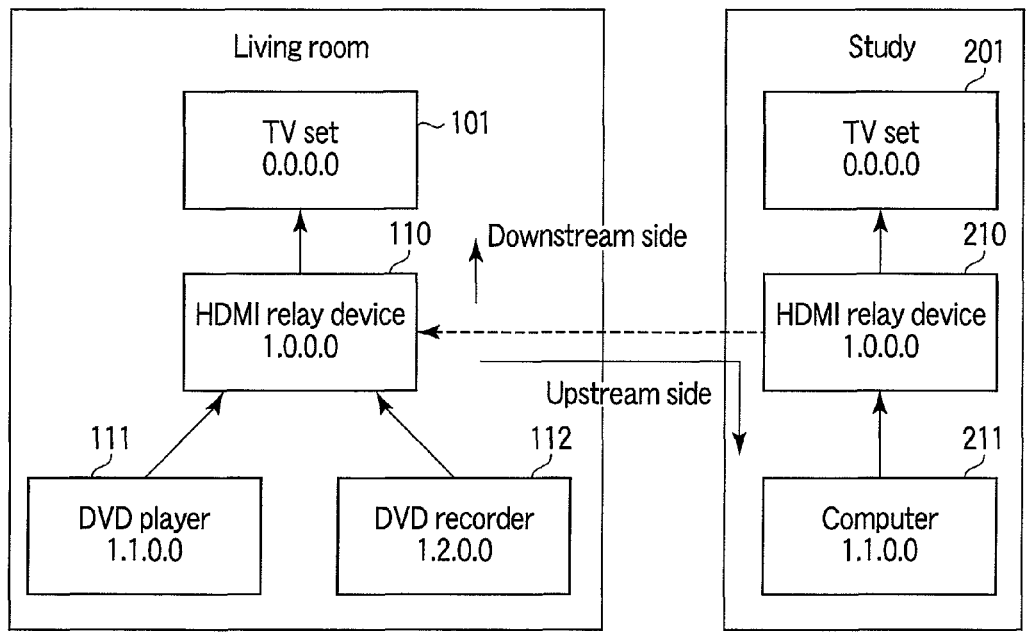
F I G. 4
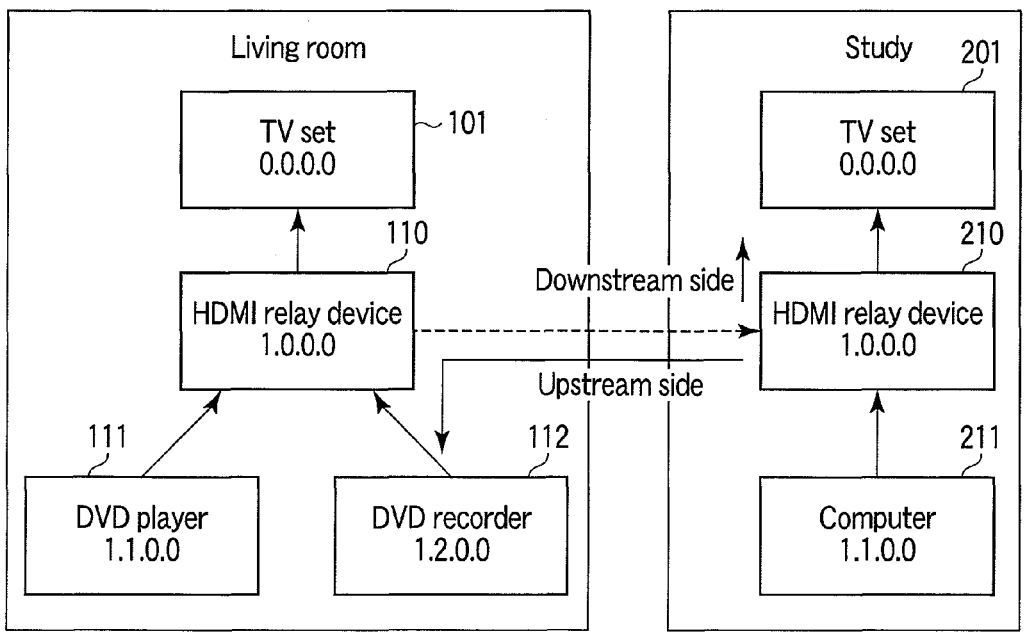
F I G. 5

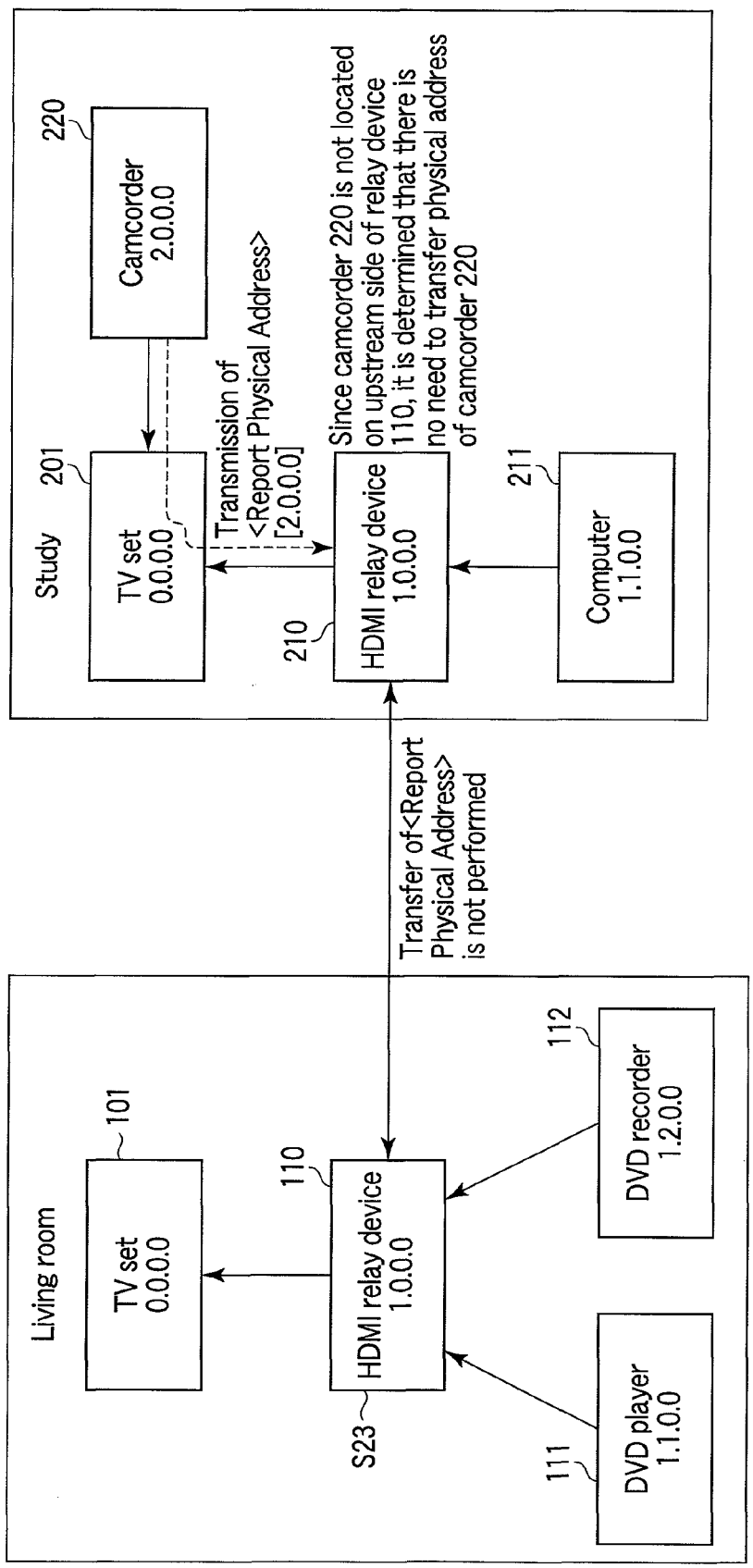
F I G. 11

RELAY DEVICE AND RELAY METHOD

CROSS-REFERENCE TO RELATED APPLICATIONS

This application is based upon and claims the benefit of priority from Japanese Patent Application No. 2008-126081, filed May 13, 2008, the entire contents of which are incorporated herein by reference.

BACKGROUND

1. Field

One embodiment of the invention relates to a relay device and a relay method that relays transmission of a video stream.

2. Description of the Related Art

The High-Definition Multimedia Interface (HDMI) standard is now becoming widely used for transmission of a video signal and an audio signal between a television set and a recording device.

Jpn. Pat. Appln. KOKAI Publication No. 2008-35190 discloses a technique in which a display device requests a physical address for an external device on an HDMI network to acquire and manage a connection state between itself and the external device.

Further, Jpn. Pat. Appln. KOKAI Publication No. 2008-34976 discloses a display system. In the display system, an audio-visual amplifier with a repeater function is connected to a display device having only one HDMI input terminal. The audio-visual amplifier has two HDMI input terminals and thereby serves as a relay device.

A conventional technique can only deal with a transmission (native) between devices on a transmission path B or a transmission (passthrough) through a device on the transmission B to a device on a transmission path A which is one-to-one connected to the device on the transmission B and cannot perform physical address conversion satisfactorily when a plurality of sink devices (TV set, etc.) exist. As a result, in the conventional technique, transmission path control and video stream transmission cannot be performed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary view showing the concepts of "upstream side" and "downstream side" of the HDMI relay device when the HDMI relay device receives a stream via a relay zone;

FIG. 5 is an exemplary view showing the concepts of "upstream side" and "downstream side" of the HDMI relay device when the HDMI relay device transmits a stream via a relay zone;

FIG. 11 is an exemplary view showing an example of a determination on whether command transmission is performed or not according to the present embodiment;

DETAILED DESCRIPTION

Various embodiments according to the invention will be described hereinafter with reference to the accompanying drawings. In general, according to one embodiment of the invention, a relay device, which is capable of connecting a sink device on its downstream side, connecting a source device having a physical address set based on the sink device on its upstream side, having a physical address set based on the sink device, transmitting a command that is received from the sink device or source device to another relay device, and transmitting/receiving a video stream to/from the other relay device, the device comprises a reception module configure to receive the command including a parameter in which a physical address is set from the sink device or source device, an address management module configure to execute processing of acquiring a first physical address assigned to the relay device based on the sink device, processing of acquiring a second physical address assigned to the relay device based on another sink device connected to the downstream side of the other relay device, first determination processing of determining whether the command needs to be transmitted to the other relay device, second determination processing of determining, in the case where it is determined that the command needs to be transmitted to the other relay device, whether to perform conversion of the physical address included in the parameter in the other relay device, and conversion processing of converting, in the case where it is determined that the conversion of the physical address is not performed in the other relay device, the physical address included in the parameter into a physical address based on the other sink device using the first and second physical addresses, and a transmission module which transmits to the other relay device a command including the physical address after conversion as a parameter or information for requiring the other relay device to perform conversion of the physical address included in the parameter together with the command from the sink device or source device depending on the determination result of the second determination processing.

Figure 1:
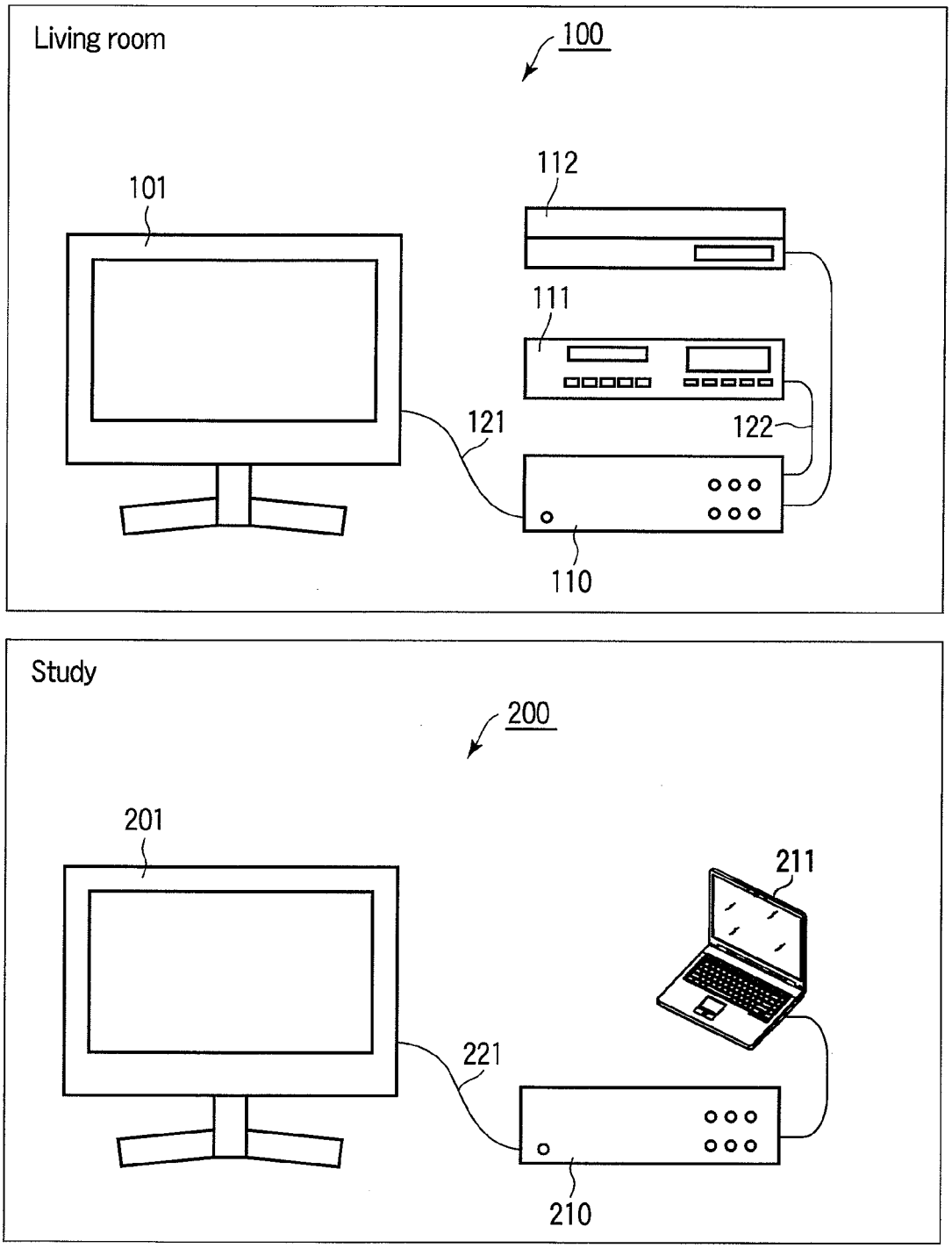
FIG. 1 is an exemplary view showing the outline of HDMI systems according to an embodiment of the present invention installed in a living room and study, respectively.

FIG. 1 is a view showing the outline of High-Definition Multimedia Interface (HDMI) systems according to an embodiment of the present invention installed in a living room and study, respectively. First, an HDMI system 100 installed in a living room will be described. The HDMI system 100 includes a TV set 101 which an electronic device that receives a terrestrial digital broadcast signal through an antenna and demodulates the signal to display video images or receives a video signal from an external device and display video images, a relay device 110, a DVD player 111 that playbacks data on a medium such as a DVD, and a hard disk drive (HDD) recorder 112 that records a broadcast video signal and a video signal from an external device and outputs the recorded content to an external device.

The TV set 101 and relay device 110 are connected to each other by an HDMI cable 121. The relay device 110 and DVD player 111 are connected to each other by an HDMI cable 122. The relay device 110 and HDD recorder 112 are connected to each other via an HDMI cable. The HDMI cable is used for transmission of a video signal and audio signal which is based on an HDMI standard. A CEC line for transmitting a signal complying with a CEC standard is provided in the HDMI cable. The CEC standard is a serial communication protocol that can control HDMI connected devices via one terminal (CEC terminal) in an HDMI terminal.

The TV set 101 checks connection with the respective electronic devices connected therewith via the HDMI cable 121 at its power-on time. This check is also performed periodically during normal operation. Transmission/reception of information on connection state is made using a command line in the HDMI cable.

Next, an HDMI system 200 installed in a study will be described. The HDMI system 200 includes a TV set 201 which an electronic device that receives a terrestrial digital broadcast signal through an antenna and demodulates the signal to display video images or receives a video signal from an external device and display video images, a relay device 210, a personal computer 211 that playbacks data on a medium such as a DVD, records a broadcast video signal and a video signal from an external device, and outputs the recorded content to an external device. The respective devices are connected by an HDMI cable 221 as illustrated.

Figure 2:
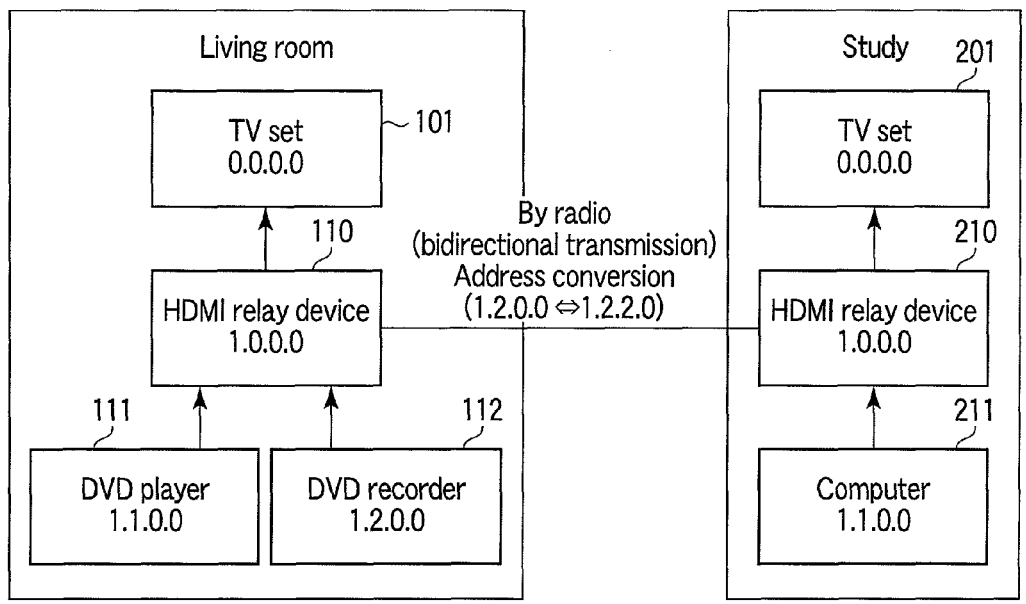
FIG. 2 is an exemplary block diagram showing an example of a configuration of an HDMI system according to the present embodiment.

FIG. 2 is a block diagram showing an example of a configuration of an HDMI system according to the present embodiment.

In this configuration, the living room and study each have one TV set, which is connected to HDMI devices such as a DVD player 111, a DVD recorder 112, and a notebook personal computer 211 via an HDMI relay device. Respective HDMI paths in the living room and study are connected by wireless transmission to each other via the HDMI relay device. Although the respective HDMI paths are connected to each other by wireless transmission, they may be connected by wire.

Figure 3:
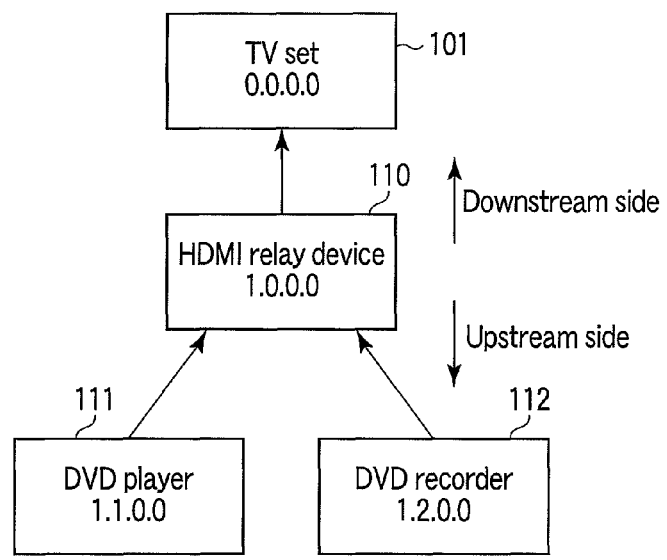
FIG. 3 is an exemplary view for explaining the concepts of "upstream side" and "downstream side" of an HDMI relay device.

FIG. 3 is a view for explaining the concepts of "upstream" and "downstream" of the HDMI relay device.

An HDMI video stream has transmission directionality. That is, the HDMI video stream flows from the HDMI output of a source device such as a DVD player to the HDMI input of a sink device such as a TV set. Likening the flow of the video stream to the flow of a river, the side into which the video stream flows is referred to as the "downstream side", and side from which the video stream flows is referred to as the "upstream side", as viewed from the HDMI relay device.

FIG. 4 is a view showing the concepts of "upstream side" and "downstream side" of the HDMI relay apparatus when the HDMI relay apparatus receives a stream via a relay zone. Bidirectional transmission can be implemented over the relay path. In the example of FIG. 4, a video stream flows from the notebook personal computer 211 to TV set 101 installed in the living room. In this case, as viewed from the HDMI relay device 110, the side of the relay path from which the video stream flows into the HDMI relay device 110 is referred to as "upstream side", and the side of the HDMI path on which the video stream flows from the HDMI relay device 110 to the TV set 101 is referred to as "downstream side".

FIG. 5 is a view showing the concepts of "upstream side" and "downstream side" of the HDMI relay device when the HDMI relay apparatus transmits a stream via a relay zone. Bidirectional transmission can be implemented over the relay path. In the example of FIG. 5, a video stream flows from the DVD player 111 to TV set 201 installed in the study. In this case, as viewed from the HDMI relay device 210, the side of the relay path from which the video stream flows into the HDMI relay device 210 is referred to as "upstream side", and the side of the HDMI path on which the video stream flows from the HDMI relay device 210 to the TV set 201 is referred to as "downstream side".

Figure 6:
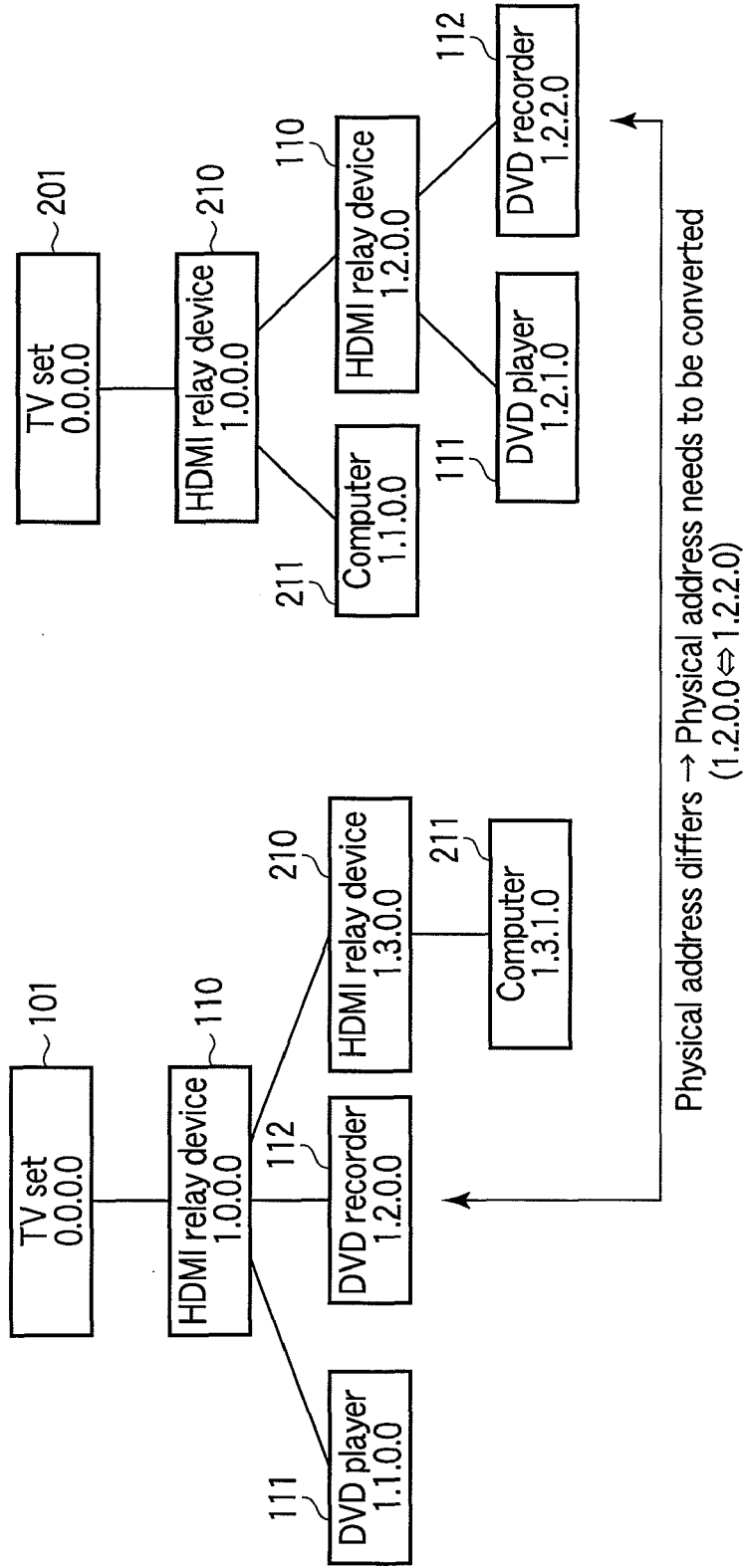
FIG. 6A and FIG. 6B are exemplary views for explaining a difference between physical addresses in the system configuration according to the present embodiment shown in FIG. 2 which is set based on respective TV sets.

FIGS. 6A and 6B are views for explaining a difference between physical addresses in the system configuration according to the present embodiment shown in FIG. 2 which is set based on respective TV sets.

The physical address is represented by the number of connection stages (digit numbers of physical address) from the TV set, which is defined using a physical address "0.0.0.0" of the TV as a starting point, and a terminal number of a terminal used for each connection. For example, in the case where the physical address of the TV in the living room of FIG. 2 is used as a starting point, the physical address of the HDMI relay device connected to an HDMI input 1 of the TV in the living room is represented as "1.0.0.0." which is obtained by changing the first digit from 0 to 1. Similarly, the physical address of the DVD recorder connected to an HDMI input 2 of the HDMI relay device is represented by "1.2.0.0" by changing the second digit of the physical address of the above HDMI relay device from 0 to 2. As described above, the physical address is defined based on the physical address "0.0.0.0." of the TV set, so that in the case where a plurality of TV sets are connected via the HDMI relay device as shown in FIG. 2, the physical address of the DVD recorder differs depending on whether the TV set in the living room or TV set in the study is used as a starting point. That is, the physical address of the DVD recorder is "1.2.0.0" as viewed from the TV in the living room, and physical address thereof is "1.2.2.0" as viewed from the TV in the study. Thus, in order to correctly perform transmission control (path control) of a video stream from the TV in the living room or TV in the study using the physical address, it is necessary to correctly perform address conversion between the HDMI relay devices.

Figure 7:
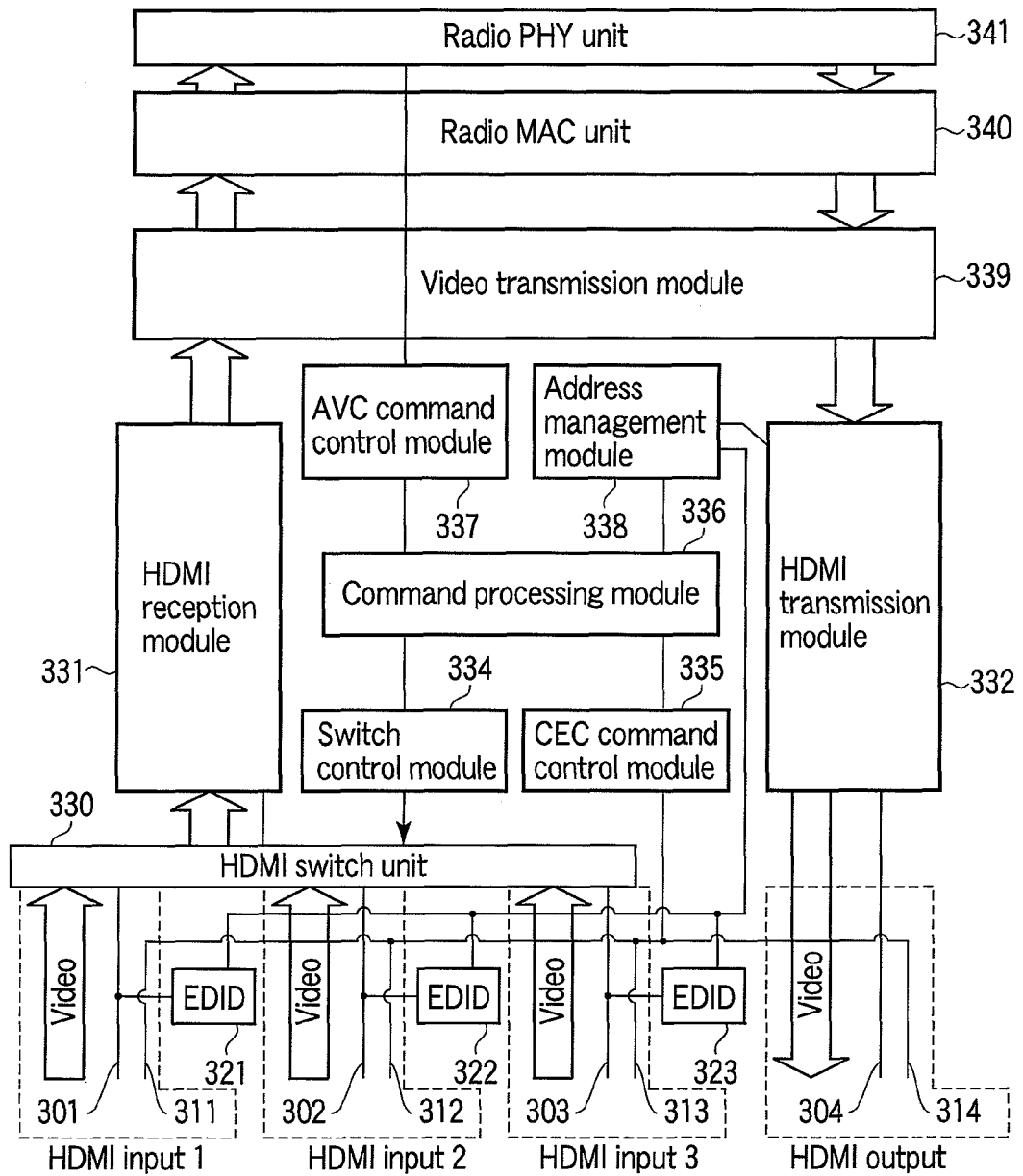
FIG. 7 is an exemplary block diagram showing the outline of the HDMI relay device according to the present embodiment.

FIG. 7 is a block diagram showing the outline of the HDMI relay device according to the present embodiment.

The HDMI relay devices 110 and 210 each have an HDMI input 1, an HDMI input 2, and an HDMI input 3. The HDMI input 1 has an address line 301, a command line 311, and the like. The HDMI input 2 has an address line 302, a command line 312, and the like. The HDMI input 3 has an address line 303, a command line 313, and the like.

Although three input terminals are provided as the HDMI input in FIG. 7, the number of the input terminals may be any suitable number.

Further, the HDMI relay devices 110 and 210 each have extended display identification data (EDID) 321, an EDID 322, an EDID 323, and the like. The address line 301 of the HDMI input 1 is connected to the EDID 321. The address line 302 of the HDMI input 2 is connected to the EDID 322. The address line 303 of the HDMI input 3 is connected to the EDID 323. A physical address that a source device connected to the HDMI input 1 uses is described in the EDID 321 to EDID 323.

Further, the HDMI relay devices 110 and 210 each have an HDMI switch unit 330, an HDMI reception module 331, an HDMI transmission module 332, a switch control module 334, a CEC command control module 335, a command processing module 336, an AVC command control module 337, an address management module 338, a video transmission module 339, a wireless transmission media access control (MAC) unit 340, a wireless transmission physical (PHY) unit 341, and the like.

The HDMI switch unit 330 selects one video stream from those input via the HDMI input terminals 1 to 3 and transmits the selected video stream to the HDMI reception module 331. The HDMI reception module 331 executes reception processing for the transmitted video stream and then transmits the resultant signal to the video transmission module 339. The processing performed by the HDMI reception module 331 includes, e.g., decoding of an encrypted video stream and acquisition of meta-data from a video stream.

The video transmission module 339 transmits the received signal to the wireless transmission MAC unit 340 or HDMI transmission module 332. The wireless transmission MAC unit 340 determines the transmission timing and transmission order of packets transmitted from the wireless transmission PHY unit 341. The wireless transmission PHY unit 341 transmits packets according to the transmission timing and transmission order determined by the wireless transmission MAC unit 340 to the connection destination HDMI relay device. A video stream transmitted from the connection destination HDMI relay device is received by the wireless transmission PHY unit 341 and wireless transmission MAC unit 340 and is then transmitted to the HDMI transmission module 332 via the video transmission module.

Physical address information acquired from a downstream-side device via the address line of the HDMI output is received by the address management module 338 via the HDMI transmission module 332 and is subjected to address processing so as to be set in each of the EDIDs 1 to 3. The address management module 338 sets the terminal number of the connection between the HDMI relay devices to "number of HDMI input terminals+1".

A concrete example of the address processing is described in detail in HDMI Specification 1.3a ("High-Definition Multimedia Interface Specification Version 1.3a" Hitachi, Ltd./ Matsushita Electric Industrial Co., Ltd./Philips Customer Electronics, International B.V./Silicon Image, Inc./Sony Corporation/Thomson Inc./Toshiba Corporation Nov. 10, 2006).

A CEC command received from the HDMI inputs 1 to 3 or HDMI output is transmitted to the CEC command control module 335 via the command lines 311 to 314. The content of the CEC command is passed to the command processing module 336 where appropriate processing is performed.

A command received via the wireless transmission PHY unit 341 and wireless transmission MAC unit 340 is passed to the command processing module 336 via the AVC command control module 337. The command processing module 336 performs appropriate processing according to the content of the command received via the CEC command control module 335 or AVC command control module 337. For example, the command processing module 336 issues an instruction to the address management module 338 or switch unit 330 or performs command transmission via the CEC command control module 335 or command control module 337.

Although the wireless transmission MAC unit 340 and wireless transmission PHY unit 341 are provided in this configuration, they may be replaced by another connection section such as a wired transmission section.

Figure 8:
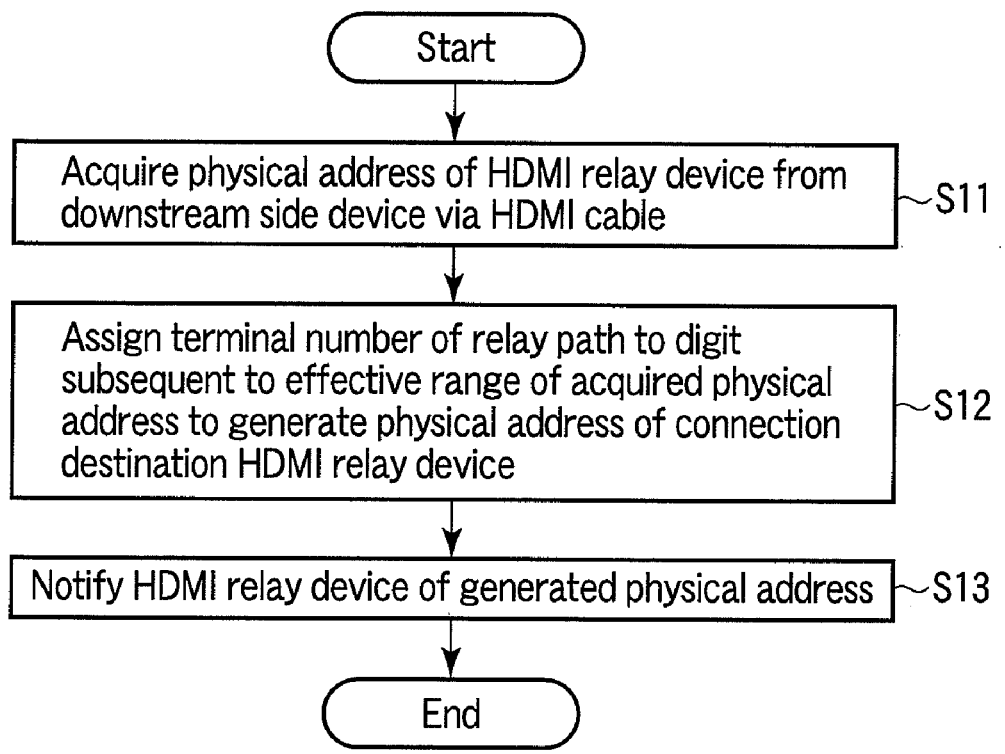
FIG. 8 is an exemplary flowchart showing a notification method of the physical address of the HDMI relay device according to the present embodiment.

FIG. 8 is a flowchart showing a notification method of the physical address of the HDMI relay device according to the present embodiment. A case will be described here where the HDMI system 200 in the study is put into operation while the HDMI system 100 in the living room is in operation.

The address management module 338 of the HDMI relay device 210 acquires its own physical address from the EDID of the downstream-side TV set 201 via the HDMI cable (step S11). In the present embodiment, the address management module 338 of the HDMI relay device 210 acquires "1.0.0.0" as its own physical address.

The address management module 338 of the HDMI relay device 210 then assigns the terminal number of the relay path to the digit subsequent to the effective range of the acquired physical address to generate the physical address of the connection destination HDMI relay device 110 (step S12). In the present embodiment, the first digit is the effective range, so that the address management module 338 of the HDMI relay device 210 assigns the terminal number of the relay path to the second digit to generate "1.2.0.0." as the physical address of the connection destination HDMI relay device.

The address management module 338 of the HDMI relay device 210 notifies the HDMI relay device 110 of the generated physical address "1.2.0.0" (step S13).

Similarly, the address management module 338 of the HDMI relay device 110 generates the physical address "1.3.0.0" of the HDMI relay device 210 from the physical address "1.0.0.0" that has already been assigned and notifies the HDMI relay device 210 of the generated physical address.

Figure 9:
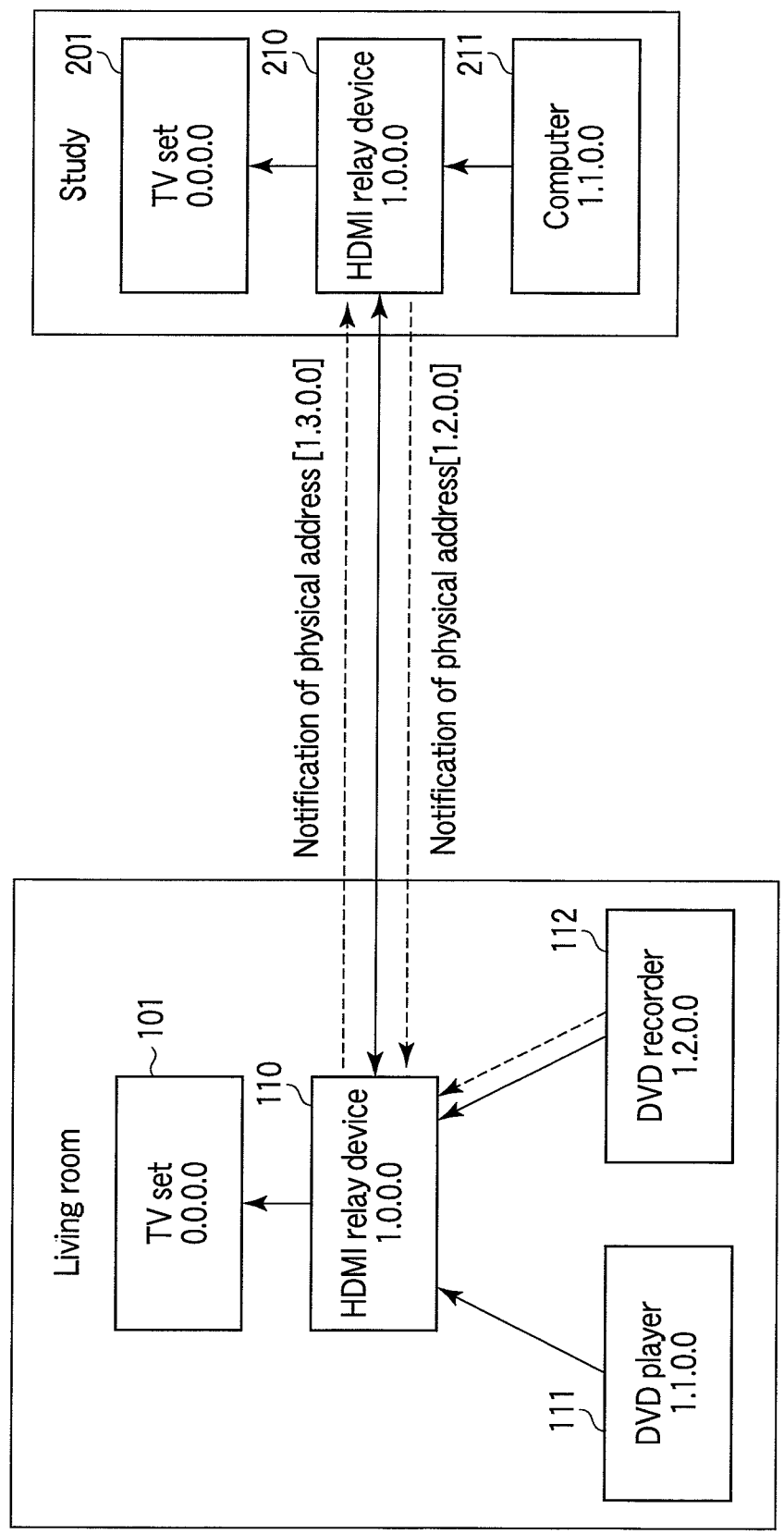
FIG. 9 is a view showing a transmission method of address information employed for physical address conversion in an address management module of the HDMI relay device according to the present embodiment.

FIG. 9 is a view showing a transmission method of address information employed for physical address conversion performed in the address management module of the HDMI relay device.

The address management module 338 of the HDMI relay device 110 notifies the HDMI relay device 210 of the physical address of the HDMI relay device 210 which is set based on the physical address of the TV set 101. Concretely, the address management module 338 of the HDMI relay device 110 replaces the second digit of the physical address "1.0.0.0" of the HDMI relay device 110 with "3" according to the physical address setting rule to generate a physical address "1.3.0.0" as the physical address of the HDMI relay device 210 as viewed from the TV set 101 and notifies the HDMI relay device 210 of the generated physical address.

Similarly, the address management module 338 of the HDMI relay device 210 notifies the HDMI relay device 110 of the physical address of the HDMI relay device 110 which is set based on the physical address of the TV set 201. When the HDMI relay device 110 is viewed from the HDMI relay device 210, the terminal number "2" of the connection between the HDMI relay devices is calculated according to the setting rule, so that the address management module 338 of the HDMI relay device 210 replaces the second digit of the physical address "1.0.0.0" of the HDMI relay device 210 with "2" to generate a physical address "1.2.0.0" as the physical address of the HDMI relay device 110 as viewed from the HDMI relay device 210 and notifies the HDMI relay device 110 of the generated physical address.

Figure 10:
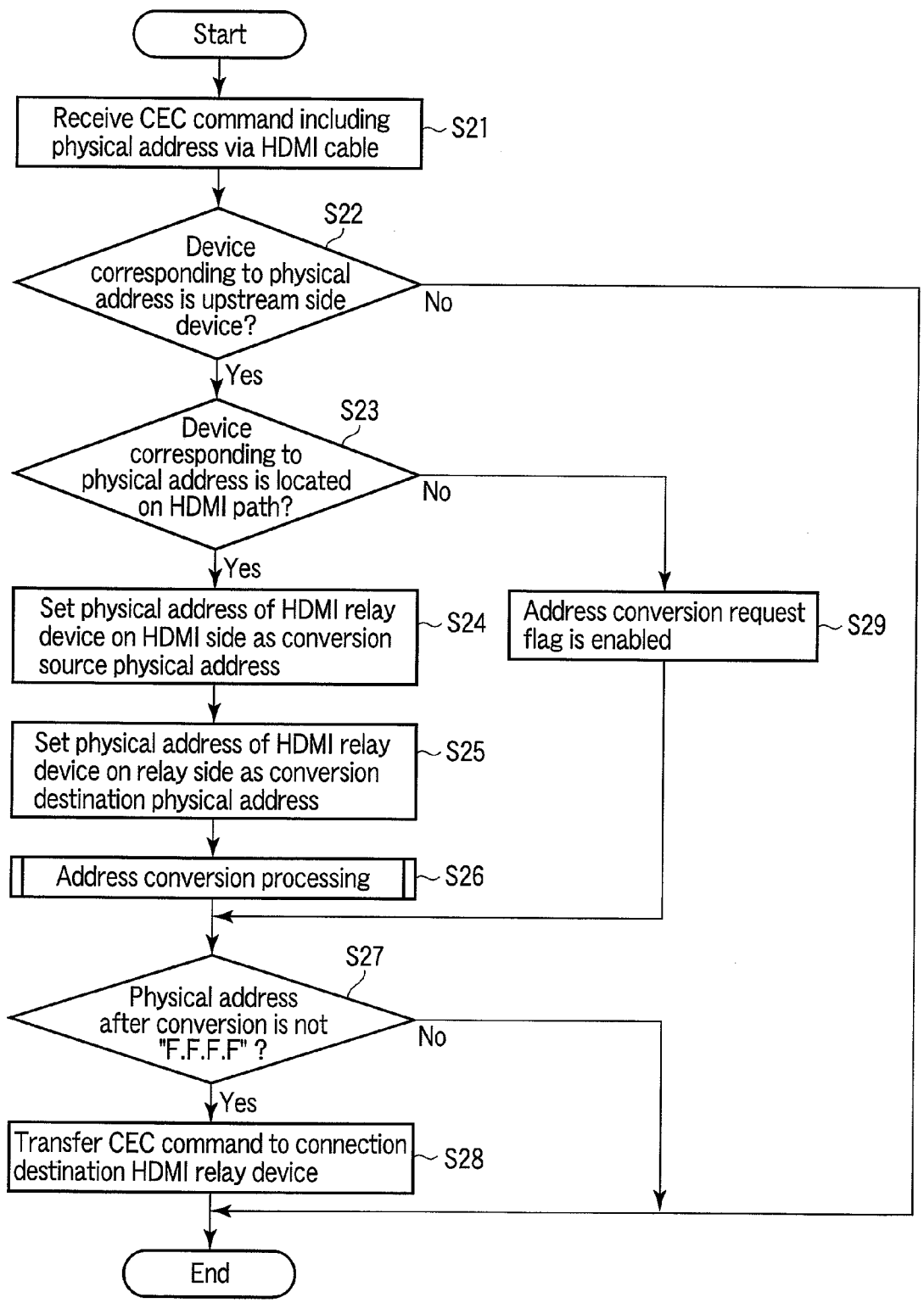
FIG. 10 is an exemplary flowchart showing a method of physical address conversion processing employed in the address management module of the HDMI relay device on the command transmission side.

Next, with reference to FIGS. 10 and 11, a method of physical address conversion processing employed in the address management module of the HDMI relay device on the command transmission side will be described.

The address management module 338 of a command transmission-side HDMI relay device receives, via the HDMI cable, a CEC command including the physical address of a device that has transmitted the command (step S21). The address management module 338 of the command transmission-side HDMI relay device determines whether the device corresponding to the physical address included in the command received in step S21 is a device on the upstream side relative to the HDMI relay device in which the address management module 338 itself is provided (step S22).

For example, a case is assumed where a camcorder 220 having a physical address "2.0.0.0" is connected to the TV set 201 in the study and the camcorder 220 transmits a "Report Physical Address" command so as to report its own physical address to the sink device, as shown in FIG. 11. Upon receiving the "Report Physical Address" command, the address management module 338 of the HDMI relay device 210 determines whether a device (camcorder 220) having the physical address "2.0.0.0" included in the "Report Physical Address" command is a device located on the upstream side relative to the HDMI relay device in which the address management module 338 itself is provided in order to determine whether to transfer or not the "Report Physical Address" command to the HDMI relay device 110.

For example, as in the case of the camcorder 220 shown in FIG. 11, a device having the physical address "2.0.0.0" included in the CEC command is located neither on the upstream side of the HDMI side nor on the upstream side of the relay path side as viewed from the HDMI relay device 110, the address management module 338 of the HDMI relay device 210 determines that the received CEC command need not be transmitted and does not perform address conversion processing and command transfer processing.

When the address management module 338 of the transmission-side HDMI relay device determines that the device having the physical address "2.0.0.0" is not located on the upstream side relative to the HDMI relay device in which the address management module 338 itself is provided (NO in step S22), it determines that the command need not be transferred and ends this flow. When the address management module 338 of the transmission-side HDMI relay device determines that the device having the physical address "2.0.0.0" is located on the upstream side relative to the HDMI relay device in which the address management module 338 itself is provided (YES in step S22), it determines whether the device corresponding to the transmission source physical address received in step S21 is located on the same HDMI path (step S23). The device located on the same HDMI path is a device having a physical address that has been set based on a sink device based on which the physical address of the HDMI relay device in which the address management module 338 itself is provided has been assigned.

When the address management module 338 of the transmission-side HDMI relay device determines that the device corresponding to the transmission source physical address is located on the same HDMI path (YES in step S23), it sets the physical address that has been assigned thereto based on the sink device on the same HDMI path as a conversion source physical address (step S24).

Then, the address management module 338 of the transmission-side HDMI relay device sets a conversion destination physical address based on a sink device on the same HDMI path as the command transfer destination HDMI relay device (step S25). The address management module 338 of the transmission-side HDMI relay device invokes an address conversion processing routine and executes the address conversion processing (step S26).

When the address management module 338 of the transmission-side HDMI relay device determines that the device corresponding to the transmission source physical address is not located on the same HDMI path (NO in step S23), it adds information for requiring address conversion to the command to be transferred to the HDMI relay device 210 (step S29). In the present embodiment, an address conversion request flag is provided in a header for transmitting the command, and the address conversion request flag is enabled.

After completion of the processing of step S26 or S29, the address management module 338 of the transmission-side HDMI relay device determines whether the physical address after conversion is not "F.F.F.F" (step S27). "F.F.F.F" represents an invalid address. When the address management module 338 of the transmission-side HDMI relay device determines that the physical address after conversion is not "F.F.F.F" (YES in step S27), it transfers the CEC command to the connection destination HDMI relay apparatus (step S28). When the address management module 338 of the transmission-side HDMI relay device determines that the physical address after conversion is "F.F.F.F" (NO in step S27), it ends this flow.

Figure 12:
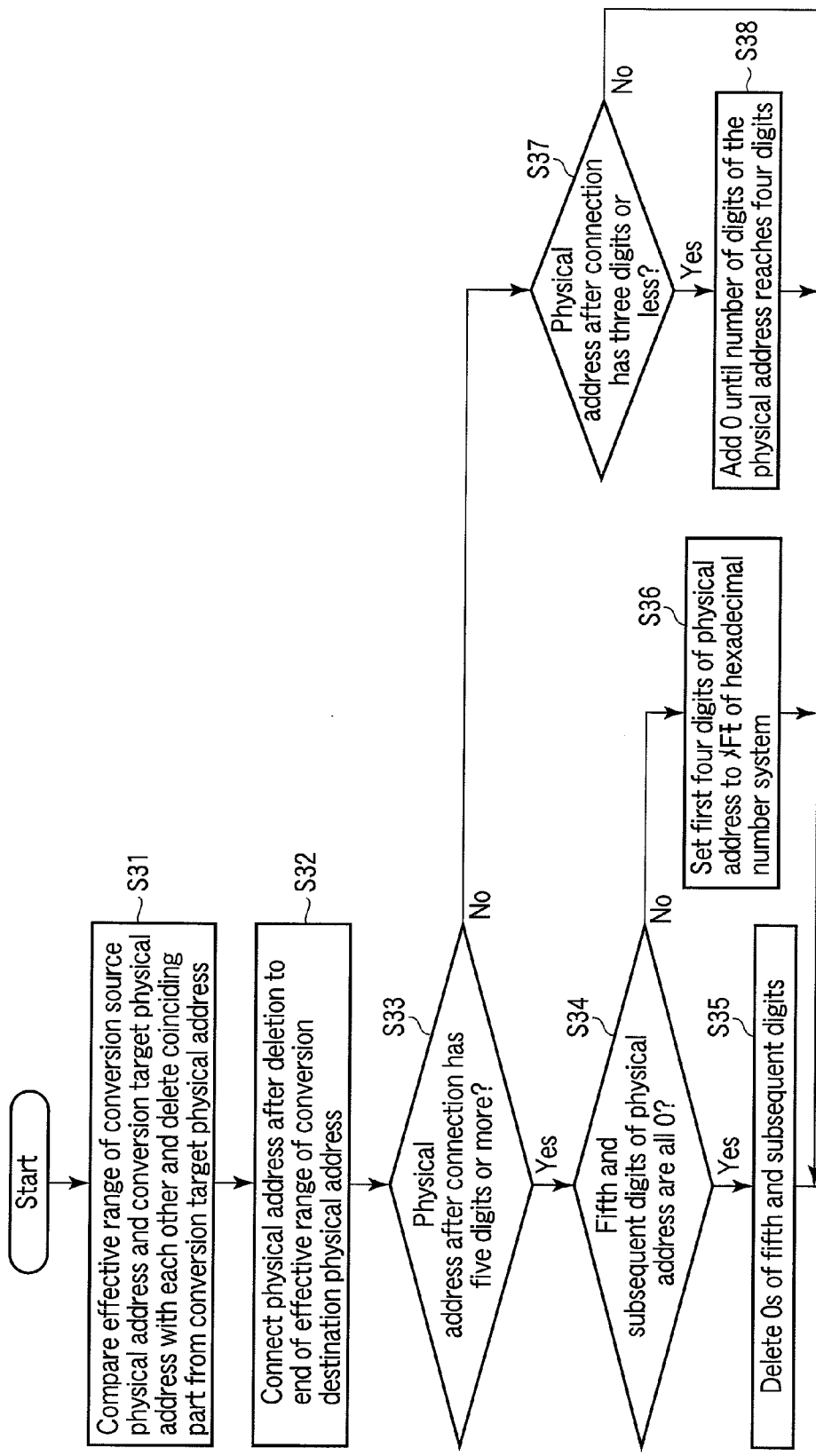
FIG. 12 is an exemplary flowchart showing an address conversion method in the present embodiment.
Figure 13:
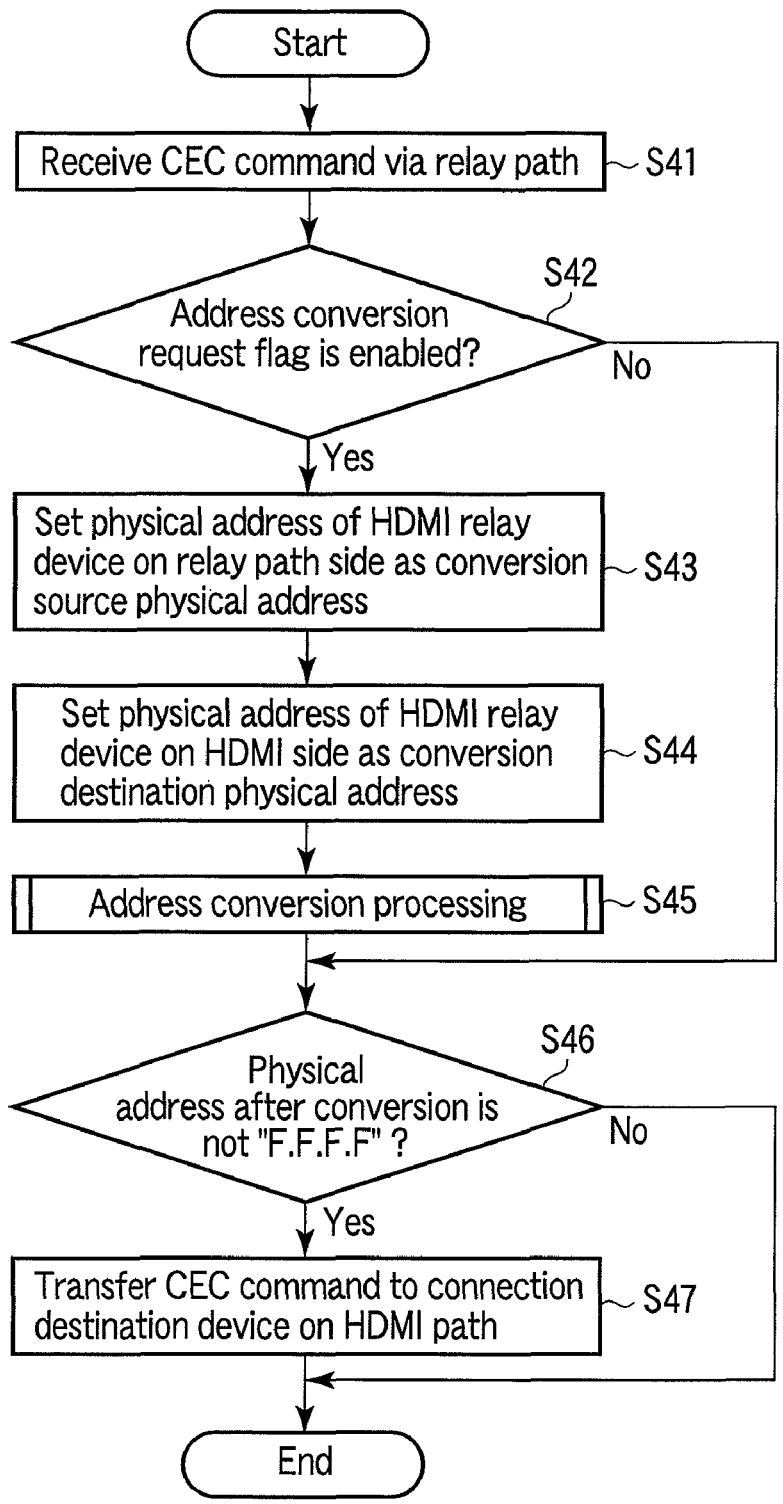
FIG. 13 is an exemplary flowchart showing a method of physical address conversion processing employed in the address management module of the HDMI relay device on the command reception side.

Next, with reference to FIGS. 13 and 14, the address conversion processing of step S26 will be described. FIG. 12 is a flowchart showing an address conversion method in the present embodiment. FIG. 13 is a view for explaining the address conversion method in the present embodiment.

The effective range of the conversion source physical address and conversion target physical address are compared with each other, and a coinciding part is deleted from the conversion target physical address (step S31). Subsequently, the resultant physical address is connected to the end of the effective range of the conversion destination physical address (step S32). Then, it is determined whether the obtained physical address has five digits or more (step S33).

When it is determined that the obtained physical address has five digits or more (YES in step S33), it is determined whether the fifth and subsequent digits of the physical address are all 0 (step S34). When it is determined that the fifth and subsequent digits are all 0 (YES in step S34), 0s of the fifth and subsequent digits are deleted (step S35). When it is determined that the fifth and subsequent digits are not all 0 (NO in step S34), the first four digits of the physical address are set to "F" (corresponding to "15" in the decimal number) of the hexadecimal number system.

When it is determined in step S33 that the number of digits of the obtained physical address is not five or more (NO in step S33), it is determined whether the obtained physical address has three digits or less (step S37). When it is determined that the obtained physical address has three digits or less (YES in step S37), 0 is added until the number of digits of the physical address reaches four digits (step S38). When it is determined that the number of digits of the obtained physical address is not three or less (NO in step S37), this flow is ended.

Next, with reference to a flowchart of FIG. 13, a method of physical address conversion processing employed in the address management module of the HDMI relay device on the transfer command reception side will be described. FIG. 13 is a flowchart showing a method of physical address conversion processing employed in the address management module of the HDMI relay device on the transfer command reception side.

The address management module 338 of the reception-side HDMI relay device receives the CEC command via the relay path (wireless transmission communication, in the case of the present embodiment) connected to the transmission-side HDMI relay device (step S41). The address management module 338 of the reception-side HDMI relay device determines whether the address conversion flag included in the header of the CEC command is enabled (step S42). When determining that the address conversion flag is enabled (YES in step S42), the address management module 338 of the reception-side HDMI relay device sets the physical address that has been assigned thereto based on the sink device on the same HDMI path as a conversion source physical address (step S43). Further, the address management module 338 of the reception-side HDMI relay device sets a conversion destination physical address based on a sink device on the same HDMI path (step S44). Then, as in the case of step S26, the address management module 338 of the reception-side HDMI relay device invokes the address conversion processing routine and executes the address conversion processing (step S45). When determining that the address conversion flag is not enabled (NO in step S42) or after completion of the address conversion processing of S45, the address management module 338 of the reception-side HDMI relay device determines whether the physical address after conversion is not "F.F.F.F" (step S46). When determining that the physical address after conversion is not "F.F.F.F" (YES in S46), the address management module 338 of the reception-side HDMI relay device transfers the CEC command to a connection destination device on the HDMI path (step S47). When determining that the physical address after conversion is "F.F.F.F" (NO in S46), address management module 338 of the reception-side HDMI relay device ends this flow.

Next, with reference to FIG. 14, a first example of the address conversion processing according to the present embodiment will be described. FIG. 14 is a first example of the address conversion processing according to the present embodiment.

Figure 14:
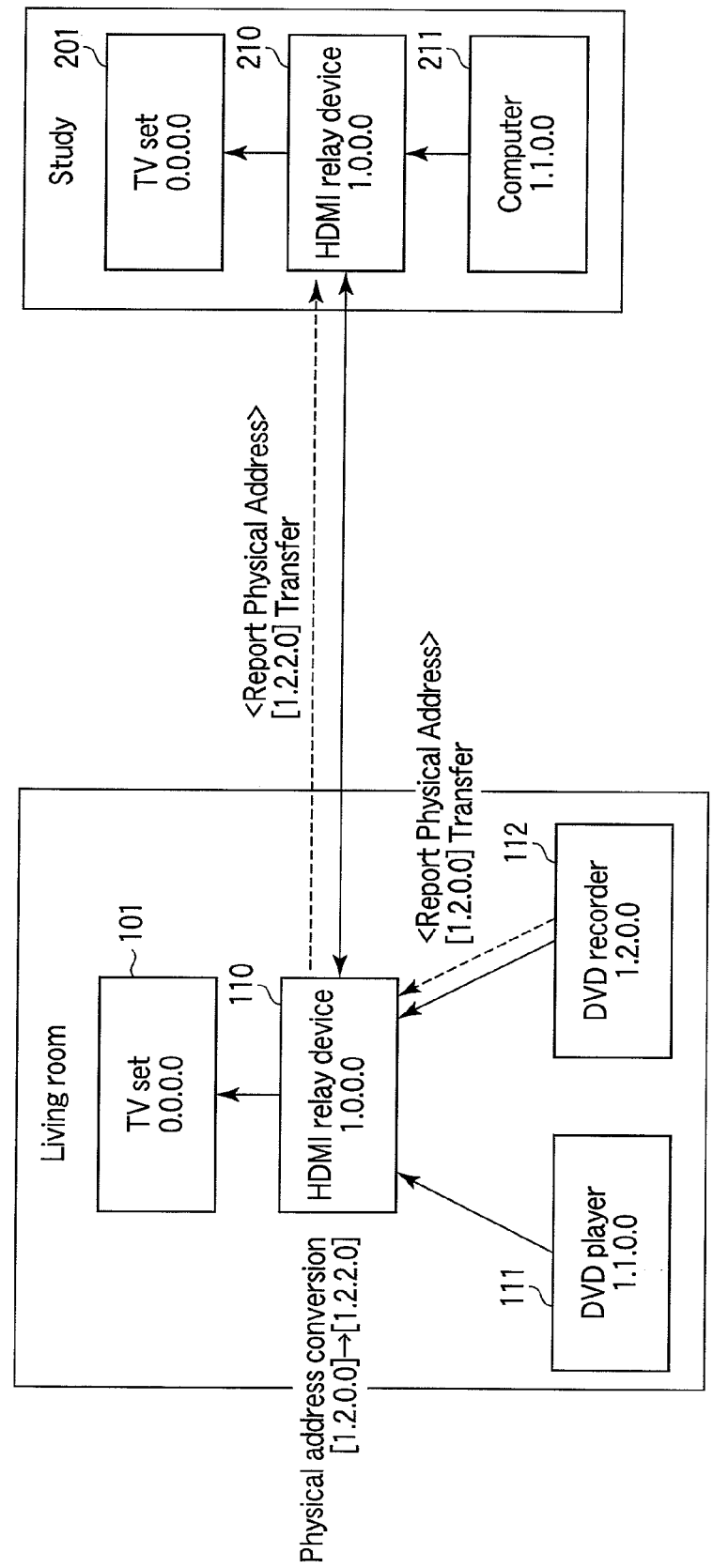
FIG. 14 is an exemplary first example of address conversion processing according to the present embodiment.

FIG. 14 shows a case where a CEC command <Report Physical Address> is transmitted from the DVD recorder 112 having a physical address "1.2.0.0". The <Report Physical Address> command includes, as a parameter, physical address information of the transmission source device. The address management module 338 of the HDMI relay device 110 that has received the <Report Physical Address> command determines whether a device corresponding to the physical address included in the <Report Physical Address> command is located on the upstream side relative to the HDMI input terminal of the HDMI relay device 110 (step S22). In the present embodiment, the DVD recorder which is the transmission source is connected to the HDMI relay device 110 and is located on the upstream side relative to the same, so that the address management module 338 of the HDMI relay device 110 determines that address conversion needs to be performed in the HDMI relay device 110 (YES in step S22). Then, the address management module 338 of the HDMI relay device 110 uses its own physical address "1.0.0.0." and a physical address "1.2.0.0." acquired from the HDMI relay device 210 to convert the physical address "1.2.0.0" included in the parameter of the <Report Physical Address> command into a physical address "1.2.2.0" based on the TV set 201 (steps S24 to S26). The address management module 338 of the HDMI relay device 110 then transfers the <Report Physical Address> command including the obtained physical address from the HDMI relay device 110 to the HDMI relay device 210.

Next, with reference to FIG. 15, a concrete example of the address conversion method will be described. In the following, the case of FIG. 14 where the HDMI relay device 110 converts the physical address included in the <Report Physical Address> command that the DVD recorder 112 has transmitted will be described.

At least two physical address information of the HDMI relay device 110 itself are required. One is a physical address "1.0.0.0" acquired from the HDMI input terminal of the downstream HDMI device (TV set 101), and the other is a physical address "1.2.0.0" acquired from the HDMI relay device 210 on the other side of the relay path.

Figure 15:
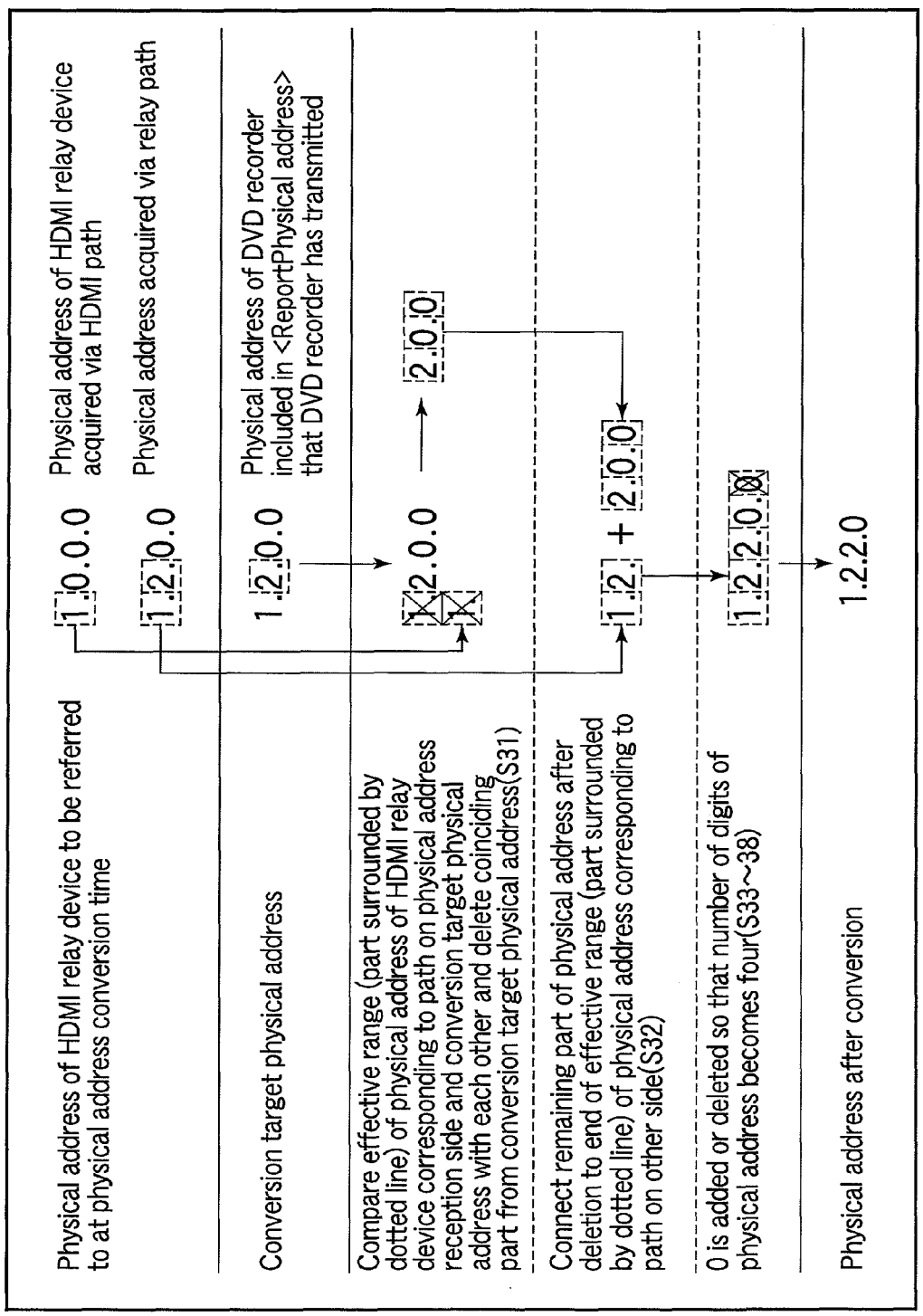
FIG. 15 is an exemplary view for explaining a concrete example of the address conversion method.

In the example of FIG. 15, "1.2.2.0" included in <Report Physical Address> [1.2.2.0] command that the HDMI relay device 110 has received is a conversion target physical address. When receiving a conversion target physical address from a device on the same HDMI path, the HDMI relay device 110 compares the effective range ("1" of the first digit) of the physical address "1.0.0.0" of the HDMI relay device 110 itself which is set based on the TV 101 with the conversion target physical address "1.2.0.0" and deletes a coinciding part from the conversion target physical address. As a result of the deletion, the conversion target physical address becomes "2.0.0". Then, the resultant physical address is connected to the end of the effective range "1.2" of the physical address "1.2.2.0" of the HDMI relay device 110 which is set based on the TV set 201. As a result, the conversion target physical address becomes "1.2.2.0.0". Finally, in the case where the number of digits of the conversion target physical address is five or more, 0s of the fifth and subsequent digits are deleted. Finally, the converted physical address becomes "1.2.2.0". In the case where the number of digits of the physical address before adjustment of the number of digits is three or less ("1.3.0", etc.), 0 is added to the end of the physical address until the number of digits of the physical address reaches four digits ("1.3.0.0"). In the case where the number of digits of the physical address is five or more and where numeric values other than 0 are included in the fifth and subsequent digits ("1.3.2.2.1", etc.), the first four digits of the physical address are set to "F" (corresponding to "15" in the decimal system) of the hexadecimal number system to convert the physical address in this case into "F.F.F.F". "F.F.F.F" represents an invalid address and processing such as transfer is not applied thereto afterward. Since the CEC command that a device on the same HDMI path is converted in the example of FIG. 14, the physical address "1.0.0.0" of the HDMI relay device 110 which is set based on the TV 101 is set as the conversion source physical address and physical address "1.2.0.0" of the HDMI relay device 110 which is set based on the TV 201 is set as the conversion destination physical address.

On the contrary, in the case where the address conversion request flag is included in the command received via the relay path, the physical address "1.2.0.0" of the HDMI relay device 110 on the relay path side is set as the conversion source physical address and physical address "1.0.0.0" of the HDMI relay device 110 on the HDMI side is set as the conversion destination physical address.

Figure 16:
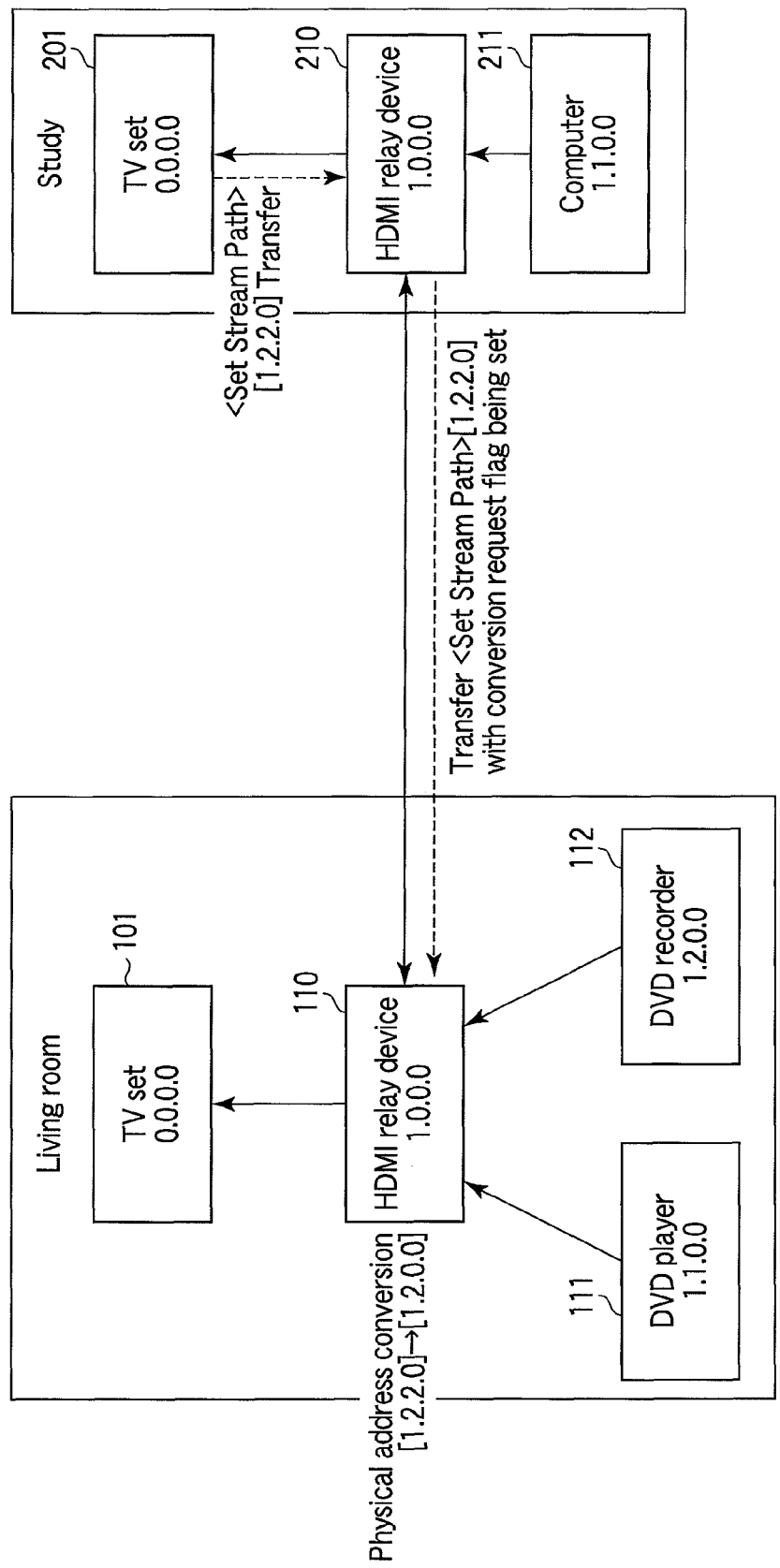
FIG. 16 is an exemplary second example of the address conversion processing according to the present embodiment.

Next, with reference to FIG. 16, a second example of the address conversion processing according to the present embodiment will be described. FIG. 16 is a second example of the address conversion processing according to the present embodiment.

FIG. 16 shows a case where a CEC command <Set Stream Path> [1.2.2.0] is transmitted from the TV set 201 in the study.

<Set Stream Path> command includes, as a parameter, physical address information of a connection destination device. The address management module 338 of the HDMI relay device 210 that has received the CEC command determines whether a device (DVD recorder 112) corresponding to the physical address included in the parameter is located on the upstream side relative to the HDMI relay device 210 (step S22).

In the example shown in FIG. 16, a device (DVD recorder 112) corresponding to the physical address included in the parameter is located on the upstream side relative to the HDMI relay device 210 via the relay path. Therefore, the address management module 338 of the HDMI relay device 210 determines that the device (DVD recorder 112) corresponding to the physical address included in the parameter is the upstream-side device (YES in step S22).

The address management module 338 of the HDMI relay device 210 then determines whether the device (DVD recorder 112) corresponding to the physical address included in the parameter is located on the same HDMI path (step S23). In the example of FIG. 16, the device corresponding to the physical address included in the parameter is not located on the same HDMI path as the HDMI relay device 210. Therefore, the address management module 338 of the HDMI relay device 210 determines that the device corresponding to the physical address included in the parameter is not located on the same HDMI path (NO in step S23).

Thus, the address management module 338 of the HDMI relay device 210 does not perform address conversion, but enables the address conversion request flag included in the header of the CEC command (step S29) and transfers the <Set Stream Path> command to the HDMI relay device 110 (step S28).

The address management module 338 of the HDMI relay device 110 confirms that the address conversion request flag is enabled and converts the physical address "1.2.2.0" into "1.2.0.0". After that, the HDMI relay device 110 transmits the <Set Stream Path> command including, as a parameter, the resultant physical address via the HDMI command line.

As described above, a relay device according to the present invention can correctly perform address conversion and path control even when the HDMI paths on which a plurality of sink devices (TV sets) exist are connected by wireless transmission, thereby correctly perform transmission of a video stream.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A relay device configured to connect to a sink device on a downstream side of the relay device, to connect to a source device comprising a physical address based on the sink device on an upstream side of the relay device, comprising a physical address based on the sink device, to transmit a command received from either the sink device or source device to a second relay device, and to transmit and receive a video stream to and from the second relay device, the relay device comprising:

a receiver configure to receive the command comprising a parameter comprising a physical address sent from either the sink device or source device;

an address manager configured to receive a first physical address assigned to the relay device based on the sink device, to receive a second physical address assigned to the relay device based on a second sink device connected to the downstream side of the second relay device, to firstly determine whether to transmit the command to the second relay device, to secondly determine whether to convert the physical address in the parameter in the second relay device when it is determined that the command needs to be transmitted to the second relay device, and to convert the physical address in the parameter into a physical address based on the second sink device using the first and second physical addresses when it is determined that the physical address has not been converted in the second relay device; and a transmitter configured to transmit a command to the second relay device, the command comprising either the physical address after conversion as a parameter or information requesting the second relay device to convert the physical address in the parameter together with the command from either the sink device or source device depending on the determination result of the second determination.

2. The relay device of claim 1, wherein
the second determination comprises first determining whether the physical address in the parameter has been set based on the sink device, second determining that conversion of the physical address in the parameter is performed in the second relay device when determining that the physical address in the parameter has been set based on the sink device, and third determining that the physical address in the parameter is converted in the second relay device when determining that the physical address in the parameter has not been set based on the sink device.

3. The relay device of claim 1, wherein the first determination is configured to determine that the command need not to be transmitted to the second relay device, when a device to which the physical address in the parameter is assigned is not located on the upstream side relative to the relay device.

4. The relay device of claim 1, wherein
the command and the video stream are transmitted by a wireless transmission communication.

5. The relay device of claim 1, wherein
the video stream and the command are transmitted in accordance with an HDMI standard.

6. A relay device configured to connect to a sink device on a downstream side of the relay device, to connect to a source device comprising a physical address based on the sink device on an upstream side of the relay device, comprising a physical address based on the sink device, to receive a command transferred from a second relay device, and to transmit and receive a video stream to and from the second relay device, the relay device comprising:

a receiver configured to receive the command comprising a parameter comprising a physical address sent from the second relay device;

an address manager configured to receive a first physical address assigned to the relay device based on the sink device, to receive a second physical address assigned to the relay device based on a second sink device connected to the downstream side of the second relay device, to determine whether information requesting conversion of the physical address in the parameter has been transmitted to the relay device together with the command transferred from the second relay device, and to convert the physical address in the parameter into a physical address based on the second sink device using the first and second physical addresses when it is determined that the information requesting conversion of the physical address in the parameter has been transmitted to the relay device together with the command; and a transmitter configured to transmit either a command comprising the physical address after conversion as a parameter or the command that the receiver has received to a transmission destination.

7. The relay device of claim 6, wherein
the command and the video stream are transmitted by a wireless transmission communication.

8. The relay device of claim 6, wherein
the video stream and the command are transmitted in accordance with an HDMI standard.

9. A relay method comprising:
connecting a first sink device on a downstream side of a relay device;
connecting a source device comprising a physical address based on the first sink device on an upstream side of the relay device;
transmitting a command received from either the first sink device or source device to a second relay device;
receiving a first physical address assigned to the relay device based on the sink device at the relay device;
receiving a second physical address assigned to the relay device based on second sink device connected to the downstream side of the second relay device;
receiving the command comprising a parameter comprising a physical address sent by either the first sink device or source device at the relay device;
firstly determining whether to transmit the command to the second relay device;
secondly determining whether to convert the physical address in the parameter in the second relay device when it is determined that the command needs to be transmitted to the second relay device;
converting the physical address in the parameter into a physical address based on the second sink device using the first and second physical addresses when it is determined that the physical address is to be converted in the second relay device;
transmitting a command to the second relay device, the command comprising either the physical address after conversion as a parameter or information requesting the second relay device to convert the physical address in the parameter together with the command depending on the determination result of the secondly determining;

receiving a third physical address assigned to the second relay device based on the second sink device at the second relay device;

receiving a fourth physical address assigned to the second relay device based on the second sink device connected to the downstream side of the second relay device at the second relay device;

receiving the command comprising a parameter comprising a physical address set by the relay device at the second relay device;

determining whether information requesting conversion of the physical address in the parameter has been transmitted together with the command transferred from the relay device by the second relay device;

converting the physical address in the parameter into a physical address based on the first sink device using the third and fourth physical addresses when it is determined that the information requesting conversion of the physical address in the parameter has been transmitted together with the command, by the second relay device; and transmitting either a command comprising the physical address after conversion as a parameter or the received command from the second relay device to a transmission destination.

10. The relay method of claim 9, wherein
the determining whether to convert comprises first determining whether the physical address in the parameter has been set based on the first sink device, second determining that the physical address in the parameter is to be converted in the second relay device when determining that the physical address in the parameter has been set based on the first sink device, and third determining that the physical address in the parameter is not to be converted in the second relay device when determining that the physical address in the parameter has not been set based on the first sink device.

11. The relay method of claim 9, wherein
the determining whether to transmit the command comprises determining that the command need not to be transmitted to the second relay device.

12. The relay method of claim 9, wherein
the relay device and the second relay device are configured to transmit a video stream.

13. The relay method of claim 12, wherein
the command and the video stream are transmitted by a wireless transmission communication.

14. The relay method of claim 12, wherein
the video stream and the command are transmitted in accordance with an HDMI standard.

* * * * *